INVENTOR.
WILLIAM J. BRACKMANN
BY
ATTORNEY

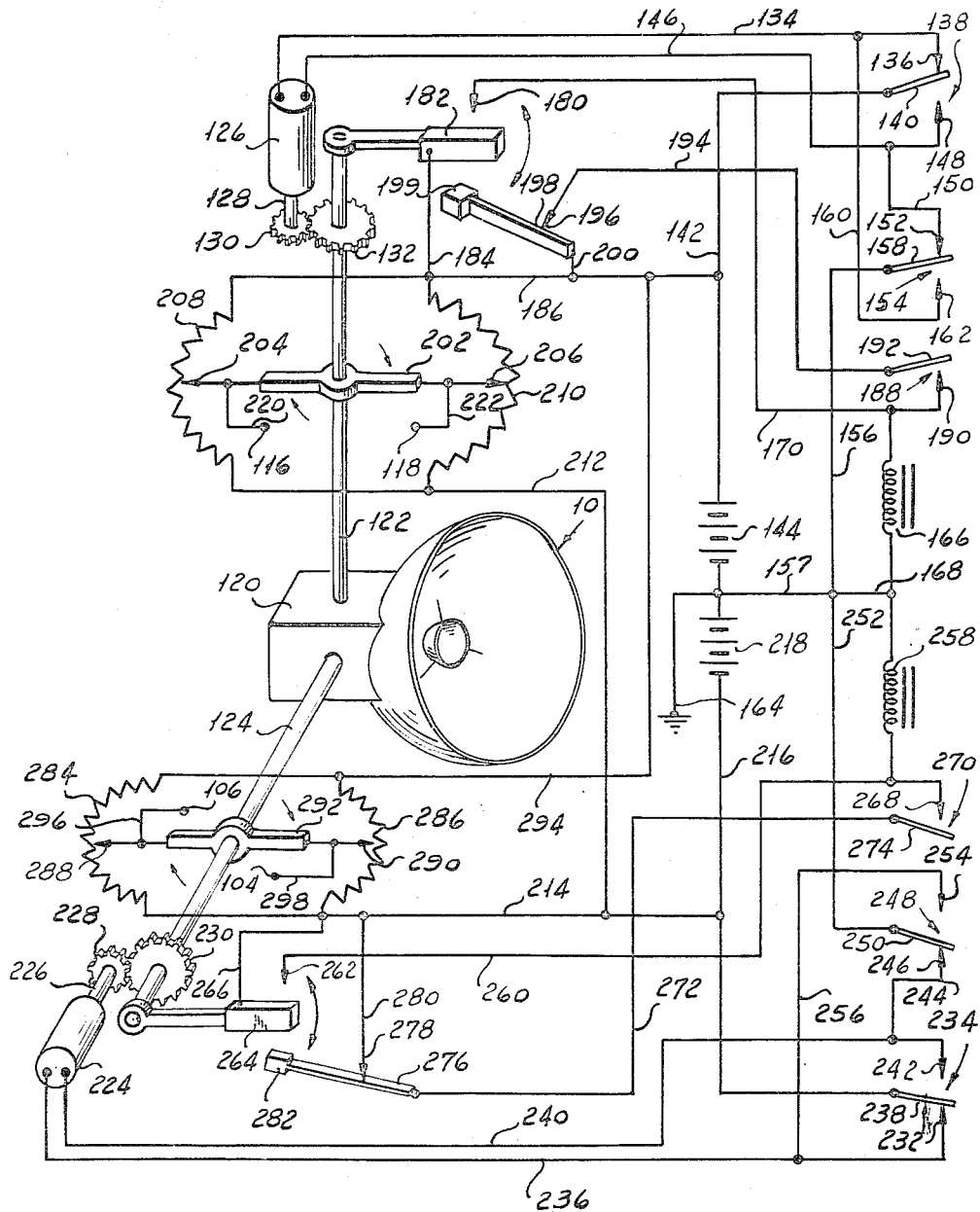

Aug. 19, 1958  W. J. BRACKMANN  2,848,626
INFRARED RADIATION DETECTION SYSTEM
Filed Sept. 2, 1955  3 Sheets-Sheet 3
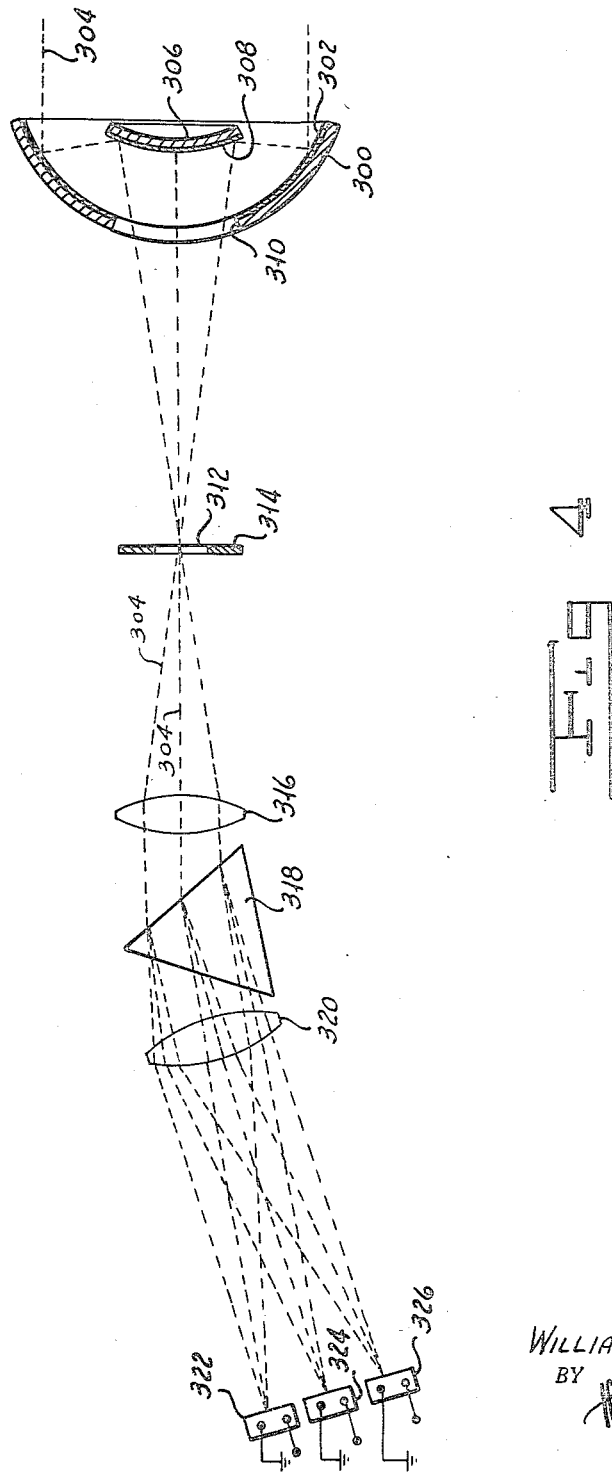
INVENTOR.
WILLIAM J. BRACKMANN
BY
ATTORNEY

:::::::::::::::::::::::::::::::::::::::::::::::::::::::::::::::::::::::::::

United States Patent Office 2,848,626
Patented Aug. 19, 1958

2,848,626

INFRARED RADIATION DETECTION SYSTEM

William J. Brackmann, Tarrytown, N. Y., assignor, by mesne assignments, to United Aircraft Corporation, East Hartford, Conn., a corporation of Delaware Application September 2, 1955, Serial No. 532,205

11 Claims. (Cl. 250—83.3)

My invention relates to an infrared radiation detection system and more particularly to a system for determining the spectral distribution of infrared radiation.

Detectors are provided in the prior art for determining the amount of infrared radiation emanating from a target toward which the detector is directed. These detectors sense and integrate the total amount of energy in the frequency band to which they are responsive and present the result as some form of amplitude display. They are incapable of differentiating between a change in temperature, which would result in a change in the amount of energy radiated in a particular portion of the infrared spectrum, and a change in emissivity of the target, which would result in a change in total radiation distributed throughout the infrared spectrum. That is, they cannot, for example, determine whether increased radiation is the result of improved emissivity or whether such an over-all increase in radiation is owing to a proportionally greater increase in radiation in one portion of the infrared spectrum.

I have invented an infrared radiation detection system by means of which the absolute temperatures of all objects in a given target area may be determined. My system is capable of distinguishing between a change in temperature and a change in emissivity of the target. My infrared radiation detection system may be employed in a scan system for producing a series of chromatically separated images of objects in the area scanned. When so employed the system essentially produces a frequency conversion from the infrared spectrum to the visible spectrum. My system may be employed as a navigational aid or to track any selected target. It provides a conveniently simple means for distinguishing between targets and identifying targets accurately.

One object of my invention is to provide an infrared radiation detection system for determining the spectral distribution of infrared radiation.

Another object of my invention is to provide an infrared radiation detection system which is capable of distinguishing between a change in temperature of a target object and a change in emissivity of the target.

A further object of my invention is to provide an infrared radiation detection system for producing a series of chromatically separated images of the objects in a scanned area.

A still further object of my invention is to provide an infrared radiation detection system by means of which the absolute temperatures of all objects in a given target area may be determined.

Yet another object of my invention is to provide an infrared radiation detection system for producing a frequency conversion from the infrared spectrum to the visible spectrum.

Other and further objects of my invention will appear from the following description.

In general my invention contemplates the provision of an infrared radiation detection system including means for collecting infrared radiation emanating from a given target area and means for directing the collected radiation to a dispersion means. My dispersion means separates the collected radiation into a number of frequency bands. The radiation in each band is directed by the dispersion means to one of a number of respective detectors. The detectors integrate the total energy content in the respective bands to produce outputs which energize suitable indicating means. The indicating means indicate the respective energy contents in the various frequency bands.

Conveniently, three detectors corresponding to the three primary colors of the visible spectrum may be employed. The detectors may energize means, such as a color cathode-ray tube, to produce a series of chromatically separated images representing objects in the target area. Suitable scanning means drives the radiation collecting means over the target area. In my system temperature of a particular target body is indicated by the color of the image produced, while emissivity is represented by the brightness of the color.

In the accompanying drawings which form part of the instant specification and which are to be read in conjunction therewith and in which like reference numerals are used to indicate like parts in the various views:

Figure 3 is a schematic view of the drive means and electrical control circuit of one form of scanning means which may be employed in my radiation detection system.

Figure 4 is a schematic view of an alternate form of my radiation detection system.

Figure 1:
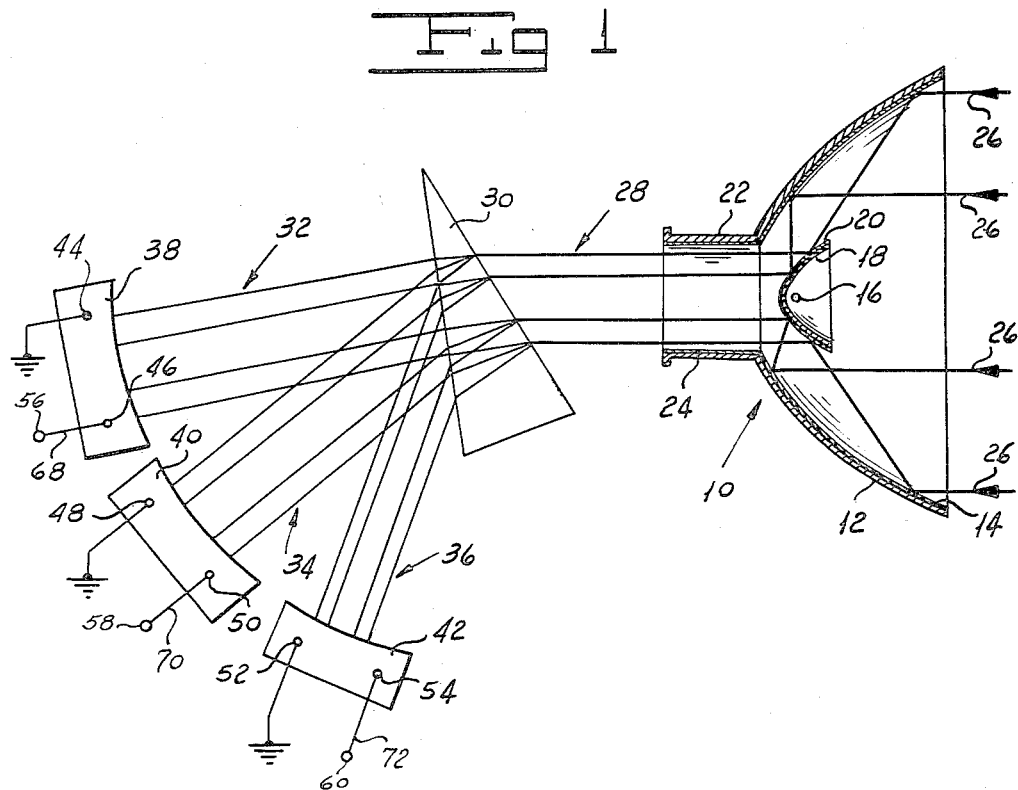
Figure 1 is a schematic view of a portion of my infrared radiation detection system showing the arrangement of the collecting means, the dispersion means, and the detectors of the system.
Figure 2:
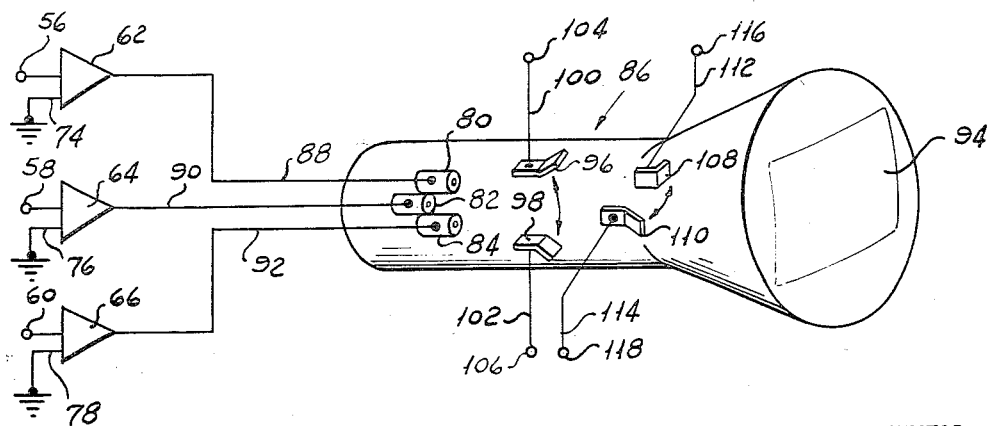
Figure 2 is a schematic view of one embodiment of the indicating means which may be employed in my infrared radiation detection system.

More particularly referring now to the drawings, my radiation detection system includes radiation collecting means, indicated generally by the reference character 10. This means includes a concave parabolic reflector 12, the interior surface 14 of which is silvered to direct incident radiation toward the focal point 16 of the reflector. The collecting means 10 also includes a convex parabolic reflector 18, the silvered surface 20 of which is disposed symmetrically about the optical axis of the reflector 12. Reflector 12 is formed with a neck 22 adjacent the center thereof through which collected radiation is directed by the reflector 18. The interior surface 24 of the neck 22 is blackened by any suitable means to confine the beam to the aperture provided by neck 22. The collecting means 10 is directed toward the desired target and parallel rays 26 of infrared radiation emanating from the target and striking the surface 14 are directed by reflector 12 toward its focal point 16. These rays 26 strike the surface 20 of reflector 18 which is disposed between surface 14 and focal point 16. The arrangement is such that rays directed by surface 14 toward focal point 16 are reflected by surface 20 through neck 22 of the reflector 12 to form the collected beam of infrared radiation, indicated generally by the reference character 28. It is to be noted that neck 22 is sufficiently long to restrict beam 28 to a narrow field.

In order to break up the beam 28 into a number of frequency bands, I dispose a dispersion prism 30 in the path of the beam 28. The prism 30 may be formed of any infrared dispersion medium such as calcium fluoride, lithium fluoride, or rock salt. Calcium fluoride and lithium fluoride are better dispersing media than rock salt. Preferably I use calcium fluoride since lithium fluoride, while a superior dispersing medium, is hygroscopic and must be protected against moisture. As the beam 28 passes through the dispersing prism 30, its component frequencies are differentially refracted to provide a number of separate beams as the split beam 28 leaves the prism. As is known in the art, higher frequency waves are refracted to a greater degree than are waves of a lower frequency. Conveniently, I orient the prism 30 to produce three general frequency bands of radiation leaving it. The radiation in the band of frequencies which is refracted least by the prism 30 is indicated generally by the reference character 32; the radiation in the next band of frequencies is indicated generally by the reference character 34; and the radiation in the band of frequencies which is refracted the most by prism 30 is indicated generally by the reference character 36. It is to be understood that the radiation leaving the prism 30 may be split into any desired number of different frequency bands. For purposes of convenience and in order to provide a color representation which is directly indicative of the temperature of the target, I split the beam 28 into three beams corresponding to three frequency bands. I make each of these frequency bands in the infrared spectrum correspond with similar frequency bands in the visible spectrum. Beam 32, which includes radiation at the lower frequencies in the infrared spectrum, is made to correspond with the color red, which is low frequency radiation in the visible spectrum. Similarly, beam 24, which includes radiation at the intermediate frequencies in the infrared spectrum, is made to correspond with the color green, which is intermediate frequency radiation in the visible spectrum. Beam 36, which includes radiation at the higher frequencies in the infrared spectrum, is made to correspond to the color blue or violet, which is high frequency radiation in the visible spectrum.

In order to obtain an indication of the respective energy contents of beams 32, 34, and 36, I dispose respective infrared radiation detectors 38, 40 and 42 in positions to receive the beams 32, 34, and 36. The detectors 38, 40, and 42 may be any suitable thermometric detectors, such, for example, as thermopiles or thermocouples. Alternately, I may employ photoconductive detectors. When beam 32 impinges on detector 38, the detector produces an output voltage at its terminals 44 and 46 which represents the total amount of energy in the beam. Similarly, detector 40 produces an output voltage at its terminals 48 and 50 which represents the total energy in beam 34. Detector 42 produces an output voltage at its terminals 52 and 54 which represents the total amount of energy in beam 36. My system produces three output voltage signals representing the respective amounts of radiation derived from beam 28 in three portions of the infrared frequency spectrum. In other words, the system results in a determination of the spectral distribution of the infrared radiation in beam 28. Any suitable indicating means connected to the terminals of the respective detectors 38, 40 and 42 may be employed to indicate the energy contents in the respective frequency bands.

I have provided a means for obtaining a visible color indication of the spectral distribution of energy in beam 28. I connect the respective terminals 44, 48 and 52 to ground. I connect the other respective output terminals 46, 50 and 54 to the input terminals 56, 58 and 60 of input amplifiers 62, 64 and 66 by conductors 68, 70 and 72. The other terminals of input amplifiers 62, 64 and 66 are connected to ground by conductors 74, 76 and 78. Amplifiers 62, 64 and 66 are connected, respectively, to the electron guns 80, 82 and 84 of a color cathode-ray tube, indicated generally by the reference character 86, by conductors 88, 90 and 92. As has been explained hereinabove, I correlate the three detectors 38, 40 and 42 with the three primary colors of the visible spectrum. Consequently, I connect the detector 38, which detects the energy in the lowest frequency band 32, with the amplifier 62 which is connected with the red electron gun 80 of tube 86. The intermediate frequency detector 40 is connected to the green input channel of tube 86 which includes amplifier 64 and gun 82. The highest frequency detector 42 is connected to amplifier 66 which is in the blue input channel of tube 86.

Tube 86 may be of any appropriate color cathode-ray type known in the art. Its screen 94 is made up of phosphors corresponding to the three primary colors of the visible spectrum. These phosphors and the electron guns 80, 82, and 84 are so aligned with respect to one another that gun 80 activates the red phosphors, gun 82 activates the green phosphors and gun 84 activates the blue phosphors. The presentation of the tube is a color image of the area toward which the collecting means 10 is directed. Owing to the manner in which I make the separate beams of radiation formed by prism 30 correspond to the primary colors in the visible spectrum, the color of the image indicates the temperature of the object. If, for example, the color corresponds to high frequency radiation in the visible spectrum, the observed object is at a high temperature and is emitting high frequency radiation in the infrared spectrum. The image of such an object would appear blue or violet on the screen 94. A relatively low temperature object would result in a red image on screen 94.

The electrical scanning means for tube 86 includes vertical deflecting plates 96 and 98 connected by respective conductors 100 and 102 to input terminals 104 and 106. Tube 86 also includes horizontal deflecting plates 108 and 110 connected by respective conductors 112 and 114 to input terminals 116 and 118.

Referring now to Figure 3, I have provided a scanning system for driving the collecting means 10, optical system, and detectors and for providing scanning potentials for the horizontal and vertical deflecting plates of tube 86. The collecting means 10, together with the optical system and detectors, is carried by a suitable gear box 120 having respective input shafts 122 and 124. Shaft 122 provides horizontal movement for the system, while shaft 124 provides vertical motion for the system. Conveniently, a different gear ratio may be provided for shaft 122 and for shaft 124 to provide different rates of scan for the horizontal and vertical movement of the system. The drive motor 126 for shaft 122 includes an output shaft 128 carrying a gear 130. Gear 130 drives a second gear 132 mounted on shaft 122 for rotation therewith. One input terminal of motor 126 is connected by a conductor 134 with one contact 136 of a first reversing relay switch, indicated generally by the reference character 138. Relay switch 138 includes an armature 140 connected by a conductor 142 with one terminal of a battery 144. A conductor 146 connects the other input terminal of motor 126 with the other contact 148 of relay switch 138. Conductor 146 is connected by a conductor 150 with a first contact 152 of a second reversing relay switch, indicated generally by the reference character 154. A conductor 156 connects the armature 158 of relay switch 154 to a conductor 157 connected to the terminal of battery 144 remote from that to which conductor 142 is connected. A conductor 160 connects the other contact 162 of relay switch 154 to conductor 134. I connect the terminal of battery 144 to which conductor 157 is connected to ground by means of a conductor 164. When armatures 140 and 158 are in a position where they engage the respective contacts 136 and 152, the circuit of motor 126 is completed to drive shaft 122 in one direction. When the respective armatures 140 and 158 are in a position where they engage contacts 148 and 162, the circuit of motor 126 is completed to drive shaft 122 in the reverse direction.

I provide a winding 166 for actuating armatures 140 and 158 to reverse the direction of rotation of motor 126. I connect one side of this winding 166 to conductor 157 by a conductor 168. The other side of winding 166 is connected by a conductor 170 with one contact 180 of a motor driven reversing switch including a contact arm 182. Arm 182 is mounted on shaft 122 for rotation therewith. A conductor 184 connects arm 182 to a conductor 186 which is connected to the conductor 142. When shaft 122 is driven in a direction to engage arm 182 with contact 180, the circuit of winding 166 is completed to move armatures 140 and 158 from a position where they engage contacts 136 and 152 to a position where they engage contacts 148 and 162. This reversal in the direction of rotation of motor 126 results in a movement of arm 182 away from contact 180 to interrupt the circuit of winding 166. I provide a holding relay switch, indicated generally by the reference character 188, for maintaining the circuit of winding 166 until the collector 10 reaches the other limit of its horizontal movement. Relay switch 188 includes a contact 190 connected to the side of winding 166 to which conductor 170 is connected. Armature 192 of relay switch 188 is connected by a conductor 194 with a second contact 196 of the motor reversing switch. A conducting arm 198 is normally urged by means such as a spring or the like (not shown) to a position to engage contact 196. A conductor 200 connects arm 198 to the conductor 186. When the circuit of winding 166 is completed by the engagement of arm 182 with contact 180, armature 192 is moved down to engage contact 190. The circuit of winding 166 is thereby maintained from winding 166 through armature 192, through conductor 194, through arm 198, through conductor 200, through conductor 186, through conductor 142, through battery 144, and through conductors 157 and 168 back to winding 166. Relay switch 188 maintains the circuit of winding 166 during the movement of arm 182 away from contact 180 and toward arm 198. Arm 198 carries a block 199 of insulating material which is positioned to be engaged by arm 182 when the limit of motion of collector 10 in one direction is reached. When arm 182 engages block 199, it moves arm 198 away from contact 196 to interrupt the holding circuit of winding 166. When the circuit of winding 166 is so interrupted, all the armatures 140, 158 and 192 return to the up position. The circuit of motor 166 is again established in a direction to drive arm 182 back toward contact 180.

Shaft 122 also drives the means for supplying potential to the horizontal deflecting plates 108 and 110 of tube 86. Shaft 122 carries for rotation therewith an arm 202. I mount brushes 204 and 206 on the respective ends of arm 202. Brushes 204 and 206 engage respective resistors 208 and 210. One end of each of the resistors 208 and 210 is connected to conductor 186. A conductor 212 connects the other ends of resistors 208 and 210 to a conductor 214. A conductor 216 connects conductor 214 with one terminal of a battery 218 associated with the vertical scan system. The other terminal of battery 218 is connected to ground by conductor 164. It will be understood that resistors 208 and 210 are connected by conductors 186 and 212 across both batteries 144 and 218. As shaft 122 rotates, the potential at one of the brushes 204 or 206 will increase while the potential at the other brush 206 or 204 decreases. I connect the respective brushes 204 and 206 to terminals 116 and 118 by respective conductors 220 and 222. This system provides a horizontal deflecting potential between plates 108 and 110 to direct the electron beams from guns 80, 82 and 84 back and forth across the screen 94 of tube 86. Since the means for providing the horizontal deflection potential and the collector 10 are driven from the same shaft, the movement of the electron beams across screen 94 is synchronized with the movement of the collector 10 in scanning.

The vertical scan drive motor 224 has a shaft 226 which carries a gear 228 for rotation therewith. Gear 228 drives a gear 230 mounted on shaft 124 for rotation therewith. I connect one terminal of motor 224 by a conductor 236 to a first contact 232 of a reversing switch, indicated generally by the reference character 234. The armature 238 of relay switch 234 is connected to conductor 216. A conductor 240 connects the other terminal of motor 224 with a contact 242 of switch 234. A conductor 244 connects conductor 240 with a first contact 246 of a second reversing switch, indicated generally by the reference character 248. The armature 250 of relay switch 248 is connected by a conductor 252 with conductor 168, which is connected by conductor 157 to the terminal of battery 218 other than that to which conductor 216 is connected. It will be seen that when armatures 250 and 238 are in the positions shown, the circuit of motor 224 is completed to drive shaft 124.

I connect the other contact 254 of relay switch 248 to conductor 236 by a conductor 256. When armatures 250 and 238 are moved to the up position where they engage respective contacts 254 and 242, the direction of drive of motor 224 reverses. I provide a relay winding 258 adapted to be energized to move armatures 250 and 238 from the normal positions where they engage contacts 246 and 232 to positions where they engage contacts 254 and 242. Conductor 168 connects one side of winding 258 to conductor 157 which is connected to the grounded terminal of battery 218. A conductor 260 connects the other side of winding 258 to a contact 262 of a reversing switch including an arm 264. Arm 264 is carried by shaft 124 for rotation therewith and is electrically connected by a conductor 266 to conductor 214. When armatures 250 and 238 engage the respective contacts 246 and 232, motor 224 drives shaft 124 in a direction to engage arm 264 with contact 262. When arm 264 engages contact 262, the circuit of winding 258 is complete and armatures 250 and 238 are moved to engage the respective contacts 254 and 242 and thereby reverse the direction of rotation of motor 224. When motor 224 reverses, arm 264 moves away from contact 262 to interrupt the circuit of winding 258.

In order to maintain the circuit of winding 258 during the movement of arm 264 away from contact 262, I connect one side of winding 258 to a contact 268 of a holding relay switch, indicated generally by the reference character 270. A conductor 272 connects the armature 274 of relay switch 270 to a conducting arm 276 of the reversing switch of motor 224. Suitable means such as a spring (not shown) normally retains arm 276 in engagement with a contact 278 connected by a conductor 280 with conductor 214. When arm 264 engages contact 262 to complete the circuit of winding 258, armature 274 is moved to a position to engage the contact 268. This engagement of armature 274 with contact 268 maintains the circuit of winding 258 from the winding, through armature 274, through conductor 272, through arm 276, through conductor 280, through conductor 214, through conductor 216, through battery 218, and through conductors 157 and 168 back to the winding 258.

When collector 10 reaches the limit of its movement in the direction of movement of arm 264 toward arm 276, the arm 264 engages an insulated block 282, carried by arm 276, to move the arm away from contact 278. Movement of arm 276 out of engagement with contact 278 breaks the holding circuit of winding 258 and permits armatures 238, 250 and 274 to assume their normal positions which are the down positions as shown in Figure 3. This action re-establishes the circuit of motor 224 to drive arm 264 back toward contact 262.

The vertical deflection potential system includes a pair of potentiometer resistors 284 and 286 with which brushes 288 and 290 are associated. Brushes 288 and 290 are carried on the respective ends of an arm 292 mounted on shaft 124 for rotation therewith. One end of each of the resistors 284 and 286 is connected to conductor 214. A conductor 294 connects the other ends of the resistors 284 and 286 to conductor 186. It will be seen that resistors 284 and 286 are connected in parallel across both batteries 144 and 218. As shaft 124 rotates in one direction or the other, the potential at one of the brushes 288 or 290 increases while the potential at the other brush 290 or 288 decreases. I connect respective brushes 288 and 290 to terminals 106 and 104 by conductors 296 and 298 to provide a vertical deflecting potential for the electron beams from guns 80, 82 and 84. It will be appreciated that since the vertical deflecting potential means is driven from the shaft which supplies the vertical scan motion for the collector 10, both the scan motion and the deflecting potential are synchronized with each other.

Referring now to Figure 4, the alternate form of optical system of my infrared radiation detection system includes a primary mirror 300, the reflecting surface 302 of which may be formed by any suitable means such as a gold coating or the like. Mirror 300 directs rays 304 of radiation toward a secondary mirror or reflector 306, the reflecting surface 308 of which is formed by means such as a gold coating or the like. Reflector 306 converges the rays of radiation and directs them through an aperture 310 in reflector 300. The rays reflected from mirror 306 converge and pass through an aperture 312 formed by a beam confining member 314. After passing through aperture 312, the rays diverge and pass through a lens 316 formed of a suitable infrared radiation transmitting material. Lens 316 may, for example, be made of calcium fluoride, rock salt, potassium bromide, potassium chloride, or lithium fluoride. Lens 316 directs rays 304 substantially parallel with each other toward a dispersing prism 318 formed of a material such as lithium fluoride, calcium fluoride, or rock salt. Prism 318 disperses rays 304 according to frequency in the manner in which prism 30 in the embodiment shown in Figure 1 dispersed the rays of beam 20. A second lens 320 formed of an infrared radiation transmitting material directs the dispersed rays toward detectors 322, 324, and 326 which are similar to detectors 38, 40, and 42. The output signals from these detectors are fed to amplifiers 62, 64, and 66. The scanning system shown in Figure 3 or any other suitable scanning system may be employed to drive the optical system shown in Figure 4.

In operation, the collector 10 of my system is driven by the described scan system past the target areas to be scanned. Parallel rays 26 of infrared radiation emanating from the area scanned are directed by the surface 14 toward the focal point 16 of the reflector 12. These rays are intercepted by the surface 20 of reflector 18 and are redirected parallel to each other through the neck 22 of reflector 12 toward the dispersing prism 30. As the collected beam 28 passes through the prism 30, its component frequencies are refracted in varying degrees to produce three beams 32, 34, and 36 corresponding to three frequency bands. The band 32 which contains the lowest frequencies, which are refracted the least, is directed toward the detector 38 which corresponds to the color red in the visible spectrum. The respective beams 34 and 36 are directed toward detectors 40 and 42 which correspond, respectively, to the primary colors green and blue of the visible spectrum. The outputs from the respective detectors 38, 40, and 42 are amplified by amplifiers 62, 64, and 66 and are fed to the respective electron guns 80, 82, and 84 of tube 86. Guns 80, 82, and 84 activate the respective red, green, and blue phosphors on the screen 94 of tube 86. The resultant presentation on the screen 84 is a series of chromatically separated images representative of the target area being scanned by the collector 10. The color of a particular image indicates the absolute temperature of the object corresponding to the image. The brightness of color indicates the relative emissivity of the object. For example, if the target object is relatively cool, most of the incident radiation will be in the band of frequencies covered by beam 32. Consequently, the object appears red on screen 94. If the object has good emissive properties, the red will be bright. If the object is a poor emitter, the image will be red but will be relatively less bright. If radiation from a hot object is being received, the image on screen 94 will be predominantly blue or violet. The brightness of the violet image is determined by the emissive properties of the object. In essence, my system determines the spectral distribution of the incident infrared radiation on the collector 10.

While I have shown and described my system as employing a visible presentation in the form of a color display, it will be understood that other forms of indicators may be employed. For example, indicating meters could be connected to the output terminals of the detectors 38, 40, and 42. The spectral distribution of radiation would then be determined by the relative readings of the respective meters. The emissivity of a particular object would be determined by the magnitude of the readings on the respective meters. It is to be understood also that the scanning system I provide may, if desired, be replaced by any other appropriate scanning system.

It will be seen that I have accomplished the objects of my invention. I have provided an infrared radiation detection system which determines the spectral distribution of infrared radiation. My system is capable of distinguishing between higher temperature of the object and increased emissivity of the object. My system produces a series of chromatically separated images, the colors of which indicate the absolute temperatures of the scanned objects and the brightness of colors of which indicate the relative emissivities of the objects. My system finds application as a navigational aid and in tracking targets, their identification and the like.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A system for detecting infrared radiation emanating from a target area including in combination means for collecting said infrared radiation, dispersion means disposed in the path of said collected radiation for splitting it into a number of separate beams corresponding respectively to a number of frequency bands, a plurality of detectors disposed in the respective paths of the separate beams for substantially simultaneously receiving radiation from the respective beams, each of said detectors adapted to produce an output signal representative of the total energy content of one of said separate beams, indicating means responsive to said output signals, and means for impressing said output signals on said indicating means.

2. A system for detecting infrared radiation as in claim 1 including a scanning drive system.

3. A system for detecting infrared radiation as in claim 1 in which said indicating means is a color cathode-ray tube.

4. A system for detecting infrared radiation as in claim 1 in which said indicating means is a color cathode-ray tube having three electron guns corresponding respectively to the colors red and green and blue of the visible spectrum, said dispersion means being arranged to split said infrared radiation into three separate beams corresponding respectively to a low and an intermediate and a high frequency band, the arrangement being such that the respective output signals produced by the detectors which receive the separate beams corresponding to the low and the intermediate and the high frequency bands are impressed on the respective electron guns which correspond to the colors red and green and blue of the visible spectrum whereby said cathode-ray tube produces chromatically separated images of the objects in said target area.

5. A system for detecting infrared radiation as in claim 1 in which said indicating means includes means for producing a series of color images of the objects in said target area, the color of an image being indicative of the temperature of the corresponding object and the brightness of the color being indicative of the emissivity of the object.

6. A system for detecting infrared radiation as in claim 1 in which said collecting means includes a first reflector having a reflecting surface and a focal point toward which radiation impinging on said surface is directed and a second reflector having a reflecting surface disposed between said first reflector surface and said first reflector focal point.

7. A system for detecting infrared radiation as in claim 1 in which said collecting means includes a first reflector having a reflecting surface and a focal point toward which radiation impinging on said surface is directed and a second reflector having a reflecting surface disposed between said first reflector surface and said first reflector focal point for directing radiation reflected from said first reflector surface in a collected beam, and a neck having a blackened interior surface formed on said first reflector, said collected beam being directed by said second reflector through said neck.

8. A system for detecting infrared radiation as in claim 1 in which said dispersion means is a prism.

9. A system for detecting infrared radiation as in claim 1 in which said dispersion means is a prism formed of rock salt.

10. A system for detecting infrared radiation as in claim 1 in which said dispersion means is a prism formed of calcium fluoride.

11. A system for detecting infrared radiation as in claim 1 including a first lens disposed between said collecting means and said dispersion means and a second lens disposed between said dispersion means and said detectors.

References Cited in the file of this patent

UNITED STATES PATENTS

| | | |
|---|---|---|
| 2,193,606 | Ulrey | Mar. 12, 1940 |
| 2,652,742 | Walsh | Sept. 22, 1953 |